United States Patent
Lorenzon et al.

(10) Patent No.: US 8,220,807 B2
(45) Date of Patent: Jul. 17, 2012

(54) PASSIVE ANTIROLL DEVICE FOR THE SUSPENSION OF A MOTOR VEHICLE, AND A SUSPENSION INCORPORATING IT

(75) Inventors: Cédric Lorenzon, Noyant de Touraine (FR); Jérôme Le Saint, Villemandeur (FR); Thierry Beauvilain, Varennes Changy (FR); Christine Faure, Amilly (FR)

(73) Assignee: Hutchinson, Paris (FR)

( * ) Notice: Subject to any disclaimer, the term of this patent is extended or adjusted under 35 U.S.C. 154(b) by 159 days.

(21) Appl. No.: 12/351,308

(22) Filed: Jan. 9, 2009

(65) Prior Publication Data

US 2009/0179397 A1 Jul. 16, 2009

(30) Foreign Application Priority Data

Jan. 10, 2008 (FR) .................................... 08 00137

(51) Int. Cl.
*B60G 21/00* (2006.01)
(52) U.S. Cl. ... 280/124.106; 280/124.152; 280/124.107; 188/372
(58) Field of Classification Search ........... 280/124.106, 280/124.107, 124.149, 124.152; 188/67, 188/71.4, 371, 372
See application file for complete search history.

(56) References Cited

U.S. PATENT DOCUMENTS

| | | | | |
|---|---|---|---|---|
| 1,445,615 A | * | 2/1923 | Ferres | ........................... 188/269 |
| 2,253,190 A | * | 8/1941 | Mistral | ................... 280/124.106 |
| 3,342,506 A | | 9/1967 | Whitfield et al. | |
| 4,973,077 A | * | 11/1990 | Kuwayama et al. | ... 280/124.107 |
| 5,174,603 A | * | 12/1992 | Lund | ........................... 188/266.2 |
| 5,749,596 A | * | 5/1998 | Jensen et al. | ............ 280/124.166 |
| 6,276,693 B1 | * | 8/2001 | Oakley et al. | .............. 280/5.506 |

(Continued)

FOREIGN PATENT DOCUMENTS

DE 39 42 654 A1 6/1991

(Continued)

OTHER PUBLICATIONS

International Search Report from priority document French Application No. 08 00137, filed Jan. 10, 2008.

*Primary Examiner* — Ruth Ilan
*Assistant Examiner* — Timothy Wilhelm
(74) *Attorney, Agent, or Firm* — Alston & Bird LLP

(57) ABSTRACT

An antiroll device for the suspension of a motor vehicle comprises a torsion bar and two lateral links articulated to this bar and to two lateral shock absorbers. At least one of the links (9) is telescopic and includes a piston (13) mounted so it can slide in a piston tube (14) via a rod (15) connected to the hinge connecting the link to the adjacent shock absorber, the piston being mobile due to the movement of this connection and cooperating in compression with return means (17) housed inside the said tube. The return means include two compressible stop components (18 and 19) which are designed to impart to the link a progressive stiffness which increases with the amplitude of the movements of the axis of the adjacent wheel (2a), so that this wheel is substantially uncoupled from the torsion bar or coupled to it for small or large-amplitude movements respectively.

15 Claims, 5 Drawing Sheets

U.S. PATENT DOCUMENTS

| | | | |
|---|---|---|---|
| 6,866,276 B2 * | 3/2005 | Carlstedt et al. | 280/124.107 |
| 7,234,714 B2 * | 6/2007 | Germain et al. | 280/124.107 |
| 7,641,208 B1 * | 1/2010 | Barron et al. | 280/124.106 |
| 2004/0173985 A1 * | 9/2004 | Bruhl et al. | 280/124.106 |
| 2005/0098974 A1 * | 5/2005 | Hwang | 280/124.107 |
| 2005/0133321 A1 * | 6/2005 | Fujishima et al. | 188/313 |
| 2008/0269987 A1 * | 10/2008 | Barron et al. | 701/38 |

FOREIGN PATENT DOCUMENTS

| | | |
|---|---|---|
| DE | 42 11 628 A1 | 10/1993 |
| DE | 195 08 611 A1 | 9/1996 |
| EP | 1 270 285 A | 1/2003 |
| FR | 2742382 A1 * | 6/1997 |
| WO | WO 03/008215 | 1/2003 |

* cited by examiner

PASSIVE ANTIROLL DEVICE FOR THE SUSPENSION OF A MOTOR VEHICLE, AND A SUSPENSION INCORPORATING IT

CROSS REFERENCE TO RELATED APPLICATIONS

This application claims priority from French Application No. 08 00137, filed Jan. 10, 2008.

FIELD AND BACKGROUND OF THE INVENTION

The present invention relates to a passive antiroll device for the suspension of a motor vehicle comprising a torsion bar and two lateral links connected to this bar and to two lateral shock absorbers of the suspension, as well as such a suspension incorporating this antiroll device.

In a known manner, front and/or rear axle suspension systems of current motor vehicles are fitted with antiroll devices which can be active (i.e. using an electronic control which modifies the characteristics of the suspension, typically via a hydraulic control) as described for example in the document DE-A-10 2005 028 327, or passive (i.e. without a power supply) as described for example in the document WO-A-03/008215.

Passive antiroll devices usually comprise a U-shaped torsion bar (also called a stabilizer bar) of which the central portion is connected to the chassis of the vehicle and of which the two curved ends are respectively connected by rigid links to the suspensions fitted to the wheels of the axle concerned. These known passive devices, such as the one in the document WO-A-03/008215, usually have a satisfactory antiroll stiffness, due to the fact that the torsion bar immediately tends to twist when one of the two wheels moves vertically in relation to the other (for example on a curve or during banked driving), this torsion thus generating a stiffness which is added to that of the shock absorber springs.

However, a major disadvantage of these passive antiroll devices lies in the fact that when one of the wheels of the axle concerned encounters a raised or recessed obstacle while driving in a straight line, the vibration received from the shock absorber concerned is transmitted via the rigid link to the torsion bar, then to the chassis of the vehicle, thus generating a source of discomfort for the passengers of the vehicle. In addition, these known devices not only couple each wheel of the axle concerned to the chassis via the torsion bar but also couple the two wheels to each other, which is also a source of discomfort for the passengers. Consequently, these known passive devices give satisfaction for the roadholding of the vehicle, but to the detriment of the comfort in the passenger compartment.

An object of the present invention is to provide a passive antiroll device for the suspension of a motor vehicle which overcomes this disadvantage, this device comprising a torsion bar and two lateral links respectively articulated, on the one hand, to the two ends of the torsion bar by two first hinges and, on the other hand, to two lateral shock absorbers of the suspension by two second hinges, at least one of the said links, or telescopic link, including a piston slidably mounted in a piston tube by means of a rod which carries this piston and which is connected to the said second connection, the piston being able to slide reversibly due to the movement of the said second connection and cooperating in compression with return means housed inside the said tube.

SUMMARY OF THE INVENTION

To this end, an antiroll device according to the invention is such that these return means include two compressible (i.e. able to be deformed by compression) stop components which are positioned about the said rod inside the said tube and which are each designed to impart to the or each telescopic link a progressive stiffness with their compression in the axial direction of the said rod. This stiffness increases with the amplitude of the ascending or descending movements of the axis of the adjacent wheel of the vehicle, so that this wheel is substantially uncoupled from the torsion bar or coupled to it for small or large-amplitude movements, respectively.

It will be noted that this device according to the invention significantly improves on existing passive antiroll devices, provided that the or each telescopic link thus has a low stiffness or rigidity for small-amplitude vertical movements of the wheel concerned (in particular the vibrations generated in a straight line by the vertical offset of one wheel in relation to the other on the same axle, as much for an upward offset as for a downward offset), which results in a vibrational uncoupling of this wheel and the torsion bar so as to prevent the transmission of these small-amplitude vibrations to the chassis of the vehicle via this torsion bar.

It will also be noted that this device according to the invention does not reduce the antiroll stiffness induced by the torsion bar in comparison with known passive devices for large-amplitude wheel movements, such as those relating to a rolling movement on a curve. In fact, the or each telescopic link according to the invention can in this case have a very high stiffness or rigidity (increasing with the amplitude of the roll) which is obtained by a high compression of one or other of the stop components and which brings the torsion bar fully into use in these large-amplitude movements.

It will also be noted that the transition between the two stiffness states (coupled mode and uncoupled mode) of the or each telescopic link according to the invention advantageously takes place continuously (i.e. without suddenly changing stiffness), which does not create a source of discomfort for the passengers of the vehicle.

To be more precise, it will be noted that the compression by the rod/piston assembly of the stop component oriented toward the said second hinge (i.e. toward the adjacent shock absorber) results in a lengthening of the corresponding telescopic link via this stop component, while the compression by this stop component assembly oriented toward the said first hinge (i.e. toward the torsion bar) results on the contrary in a shortening of the telescopic link via this other stop component.

According to another feature of the invention, the said rod can pass through two axially opposed end walls of the said piston tube by being slidably mounted in a tubular portion of the or each telescopic link which emerges from the end wall oriented toward the said first hinge and which is connected to it.

It will be noted that this rod which is mounted axially passing through the piston tube and which continues through this tubular portion imparts to the or each telescopic link which incorporates it a relatively simple structure, which can be symmetrical and, consequently, a lower manufacturing cost and increased ease of assembly and adjustment.

According to an example of the invention, these stop components are each designed to have a progressive stiffness which increases in stages with their compression in the axial direction. In a variant, these stop components can each be designed to have a progressive stiffness which increases continuously with their compression in the axial direction.

According to a first embodiment of the invention common to this example and this variant, these stop components are mounted at a specified axial distance from the piston by being respectively mounted against two axially opposed end walls of the said tube.

According to a second embodiment of the invention also common to this example and this variant, these compressible stop components are respectively mounted at an axial distance from two axially opposed end walls of the said tube by being mounted directly against two respective pressure faces of the piston.

In these first and second embodiments of the invention, these compressible stop components are arranged so as not to be compressed by the piston in its normal position corresponding to a generally zero stiffness of the telescopic link in response to the small-amplitude movements, and to be compressed by the piston in its maximum positions corresponding to high stiffnesses of the link in response to the large-amplitude movements.

According to a third embodiment of the invention also common to this example and this variant, the two compressible stop components are respectively mounted directly against two respective pressure faces of the piston and on two axially opposed end walls of the said tube, so as to be permanently compressed or decompressed by this piston with the said progressive stiffness, when the piston approaches the corresponding end wall of the said piston tube.

With regard to the shape of these two compressible stop components according to the invention, each of their cross sections can have, in a non-limiting way and independently of the examples and embodiments mentioned above:

- a continuous geometry, for example of annular shape, the stop components each then having a series of annular radial lobes which are spaced out axially and the respective axial thicknesses of which increase axially from the said piston toward a corresponding end wall of the said piston tube, or;
- a discontinuous geometry, preferably including a series of tiers open at their centers and connected axially to each other in pairs by oblique connecting bars spaced out on the periphery of the said tiers.

It will be noted that other shapes could be considered for these compressible stop components, the important thing being that they have a progressive axial stiffness (i.e. respectively increasing or decreasing continuously or in stages with their compression or decompression by the piston), in order that the or each link incorporating them has, on the one hand, a minimum stiffness for the small-amplitude vertical movements of the wheel (e.g. the vibrations generated in a straight line) for an uncoupling of the wheel and the torsion bar and, on the other hand, a maximum stiffness for the large-amplitude movements of this wheel (typically the roll on a banked curve).

Advantageously, the said stop components can each have a radially external surface closely fitting at least locally the cylindrical wall of the said piston tube. In a variant, these stop components could be radially distant from this wall.

Also advantageously, the said stop components can each be made of an elastomer of a cellular type (for example with closed cells), a compact type (i.e. a non-cellular elastomer, such as a rubber or a thermoplastic elastomer), or a thermoplastic cellular polymer.

According to a preferred embodiment of the invention, the said stop components are identical and symmetrical to each other in relation to the said piston, so that they impart to the or each telescopic link identical stiffnesses for a same pressure exerted by the said piston on these components.

It will be noted that in this preferred case, the identicalness of the stop components further simplifies the manufacture and therefore consequently reduces the overall cost of producing the antiroll device.

In a variant, the said stop components can differ in their material and/or their shape, so that they impart preadjusted axial stiffnesses to the or each telescopic link differently for a same pressure exerted by the said piston on these components.

A suspension system of a motor vehicle according to the invention is intended to be mounted on a front or rear axle of the vehicle or between these two axles (to obtain in the latter case a stiffness of the or each telescopic link which counteracts the "diving" of the chassis of the vehicle), this system including an antiroll device which is connected to two lateral shock absorbers and which is as described above in relation to the present invention.

BRIEF DESCRIPTION OF THE DRAWINGS

Other features, advantages and details of the present invention will emerge on reading the following description of an embodiment of the invention, given as a non-limiting example, the said description being given with reference to the attached drawings, in which.

MORE DETAILED DESCRIPTION

Figure 1:
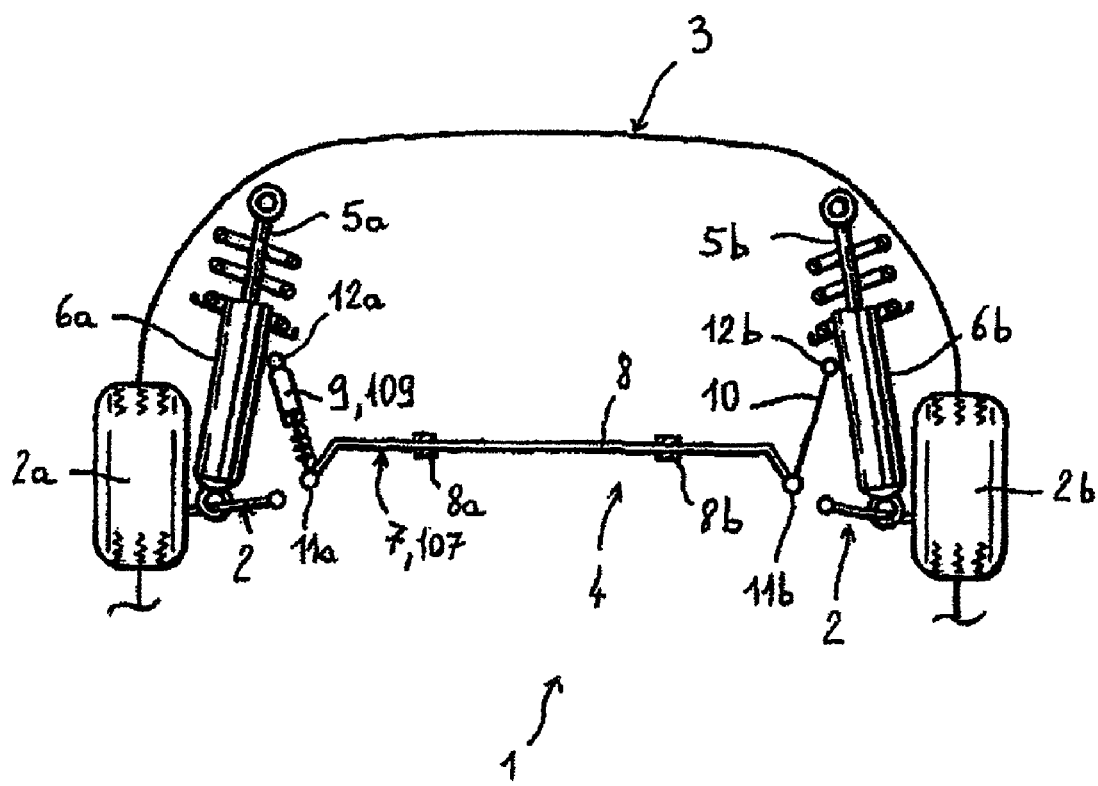
FIG. 1 is partial schematic top view of a motor vehicle front axle fitted with a passive antiroll device according to the invention.

Illustrated schematically in FIG. 1 are the main elements of an axle assembly 1 according to the invention of a front axle 2 of a motor vehicle 3. The axle assembly 1 includes in particular a suspension system 4 which includes in a known manner, on each of the two sides of the vehicle 3, a MacPherson strut 5a, 5b provided with a spring shock absorber 6a, 6b, and to which is connected a passive antiroll device 7 according to the invention.

The antiroll device 7 comprises a U-shaped torsion bar 8 mounted under the chassis of the vehicle 3 via mountings 8a and 8b and two lateral links 9 and 10 respectively articulated, on the one hand, to the two ends of the torsion bar 8 by two first hinges 11a and 11b such as ball joints and, on the other hand, to the lateral shock absorber tubes 6a and 6b fitted to the wheels 2a and 2b of the axle 2 by two second hinges 12a and 12b which can also be ball joints. In the example in FIG. 1, one of the links 9 is of a telescopic type, including (see FIG. 2) a piston 13 slidably mounted in a piston tube 14 (for example of cylindrical shape) by means of a rod 15 which carries this piston 13 at right angles and which is connected to the adjacent hinge 12a. As for the other link 10, in this example it is of a rigid type, being aware that one would not depart from the scope of the present invention by using a telescopic link 10 identical or similar to the link 9 according to the invention.

Figure 2:
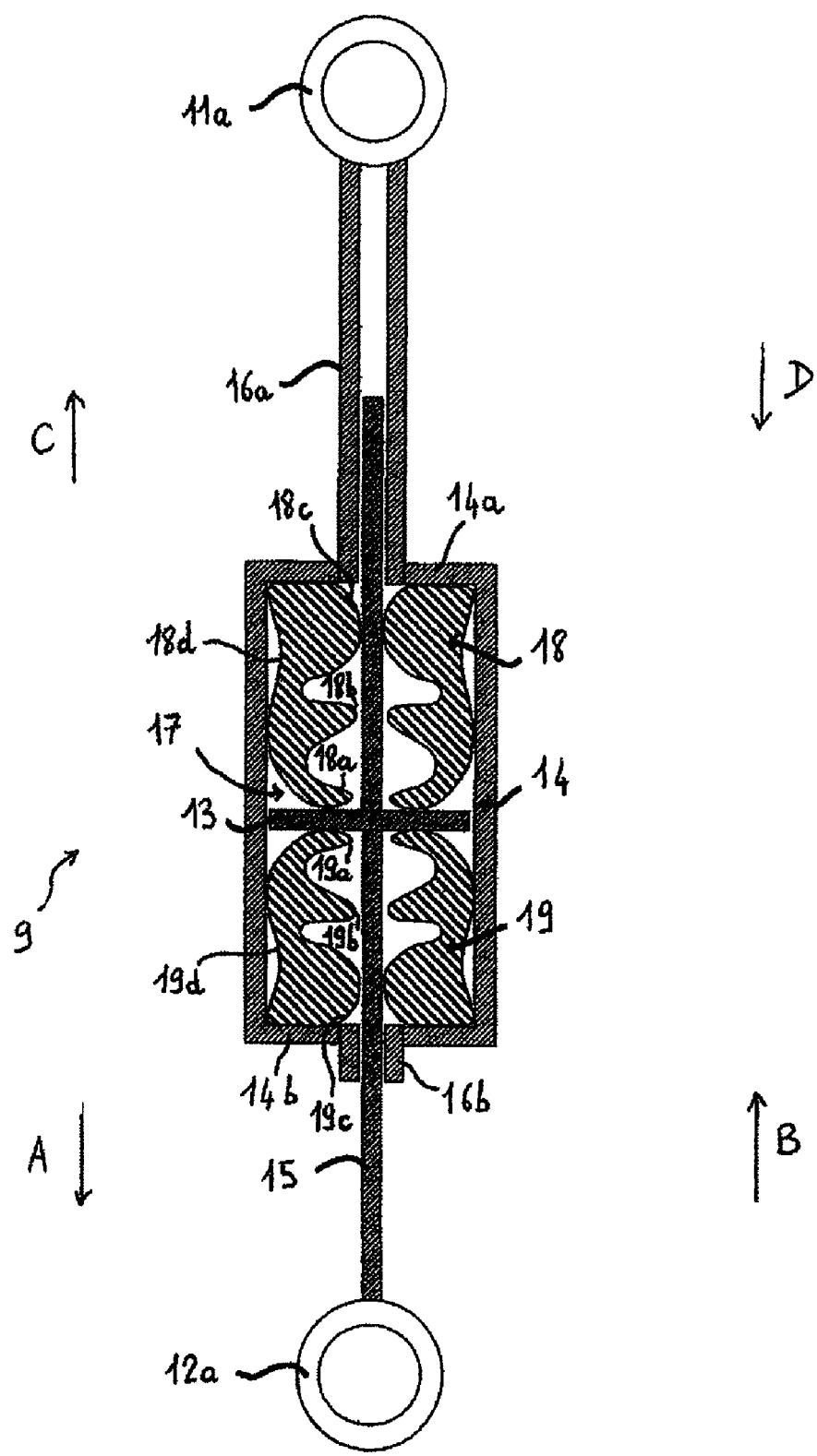
FIG. 2 is a schematic axial cross-section view, along a longitudinal median plane, of the telescopic link illustrated in FIG. 1 according to an embodiment of the invention.

As illustrated in FIG. 2, the rod 15 extends on either side of the piston 13 and passes through the two (axially opposed) radial end walls 14a and 14b of the tube 14 by being slidably mounted in two coaxial tubular portions 16a and 16b of the link 9 which are respectively connected to these walls 14a and 14b. To be more precise, a tubular portion 16a directly connects the hinge 11a to the adjacent end wall 14a, while the other tubular portion 16b extends from the other end wall 14b and terminates at a distance from the hinge 12a facing it.

In this manner, the piston 13 can slide reversibly due to the movement of the hinge 12a with the shock absorber 6a and this piston 13 cooperates during compression/decompression with return means 17 housed inside the tube 14.

These return means 17 include two compressible stop components 18 and 19 which are positioned coaxially about the rod 15, respectively on the two pressure faces of the piston and on the two end walls 14a and 14b of the tube 14, in the example in FIG. 2. These two stop components 18 and 19 which are advantageously identical in the embodiment in FIG. 2, are each able to impart to the link 9, depending on their degree of compression or decompression in the axial direction of the rod 15, progressive stiffness values (increasing in stages, i.e. discontinuously in this embodiment).

To this end, the stop components 18 and 19 are each made of the same elastomer and/or cellular material and each have three annular radial lobes 18a, 18b, 18c and 19a, 19b, 19c in the example in FIG. 2, of which the respective axial thicknesses increase axially from the pressure face of the piston 13 toward the corresponding end wall 14a or 14b.

As can be seen in FIG. 2, the stop components 18 and 19 each have in this example an annular radial section and a radially external surface generated by rotation closely fitting locally the tube 14, and they are positioned symmetrically in relation to the plane of the piston 13, so that they impart to the link 9 identical progressive stiffnesses for identical pressures and in the opposite direction received from the piston 13. To be more precise, the radially external surface 18d, 19d of each component 18, 19 has at rest a generally cylindrical shape which includes an axially annular external portion (intended to be oriented toward the end wall 14a or 14b) of concave shape which flexes generally at axial mid-height of the component 18, 19 by means of an axially annular internal portion of convex shape. Between these two portions are formed, on the radially internal surface of the component 18, 19, the lobes 18a to 18c, 19a to 19c which are connected to each other by annular recesses.

Figure 3:
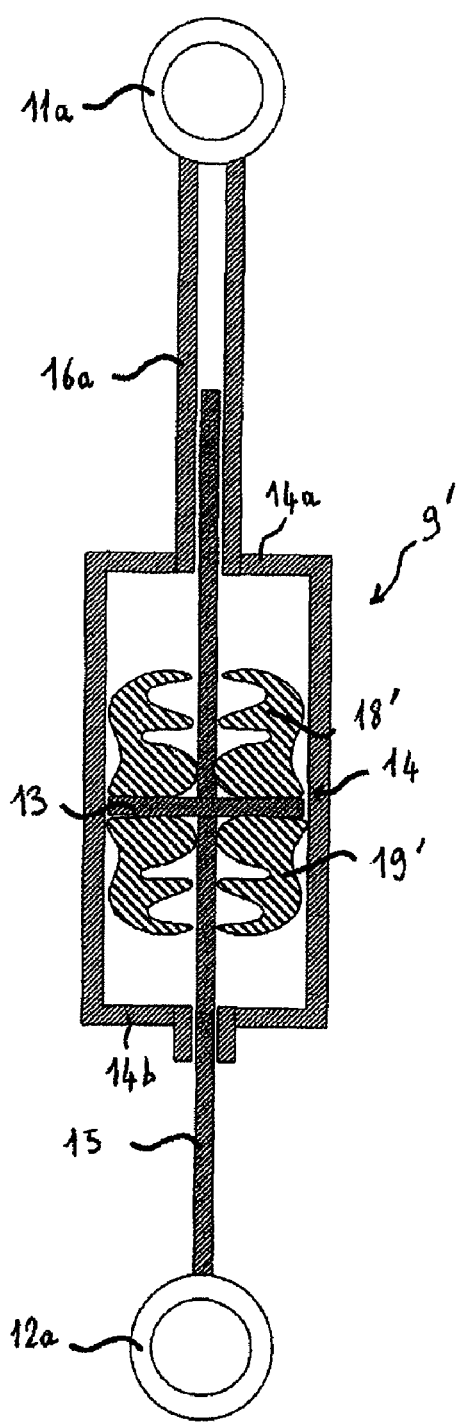
FIGS. 3 and 4 respectively are two schematic axial cross-section views, along a longitudinal median plane, of the telescopic link in FIG. 1 according to two variants of the invention of the stop components in FIG. 2.

In the variant embodiment in FIG. 3, the telescopic link 9' only differs from the link 9 in FIG. 2 by the arrangement of the stop components 18' and 19' on either side of the piston 13. In fact, FIG. 3 shows that the components 18' and 19' are respectively mounted at an axial distance from the two end walls 14a and 14b of the piston tube 14 by being solidly connected to the two pressure faces of the piston 13. In this example in FIG. 3, the axial thickness of each stop component 18', 19' (with three annular radial lobes, as in FIG. 2) decreases in the direction of the corresponding end wall 14a or 14b.

Figure 4:
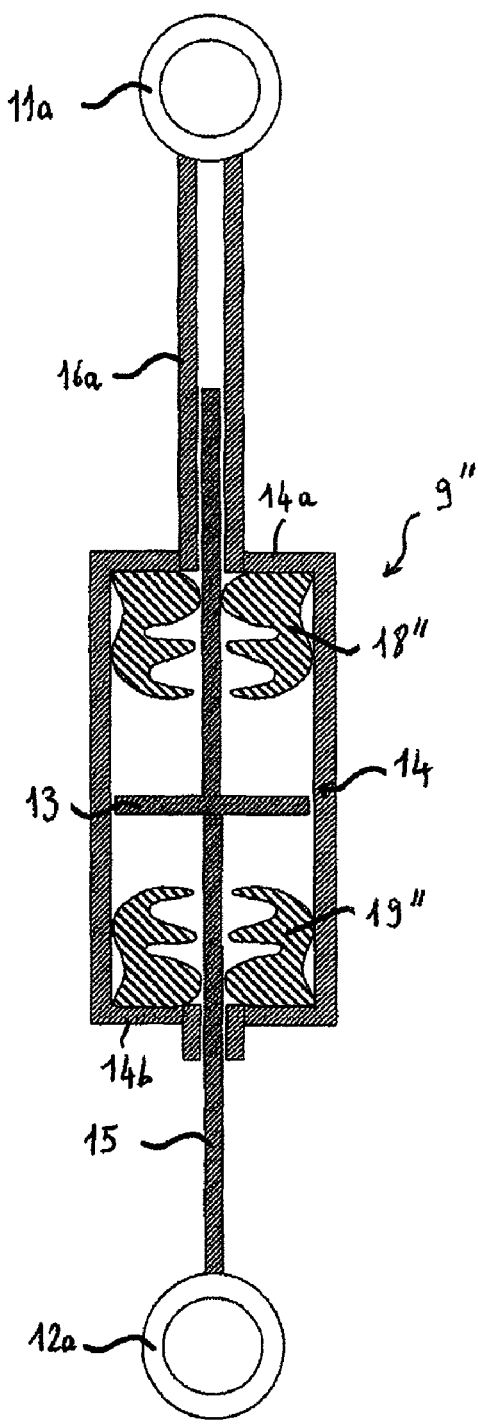

In the variant embodiment in FIG. 4, the telescopic link 9" only differs from the link 9 in FIG. 2 in that the stop components 18" and 19" are mounted at an axial distance from the piston 13 by being respectively mounted against the two axially opposed end walls 14a and 14b of the piston tube 14. In this example in FIG. 4, the axial thickness of each stop component 18", 19" (with three annular radial lobes, as in FIG. 2) increases in the direction of the corresponding end wall 14a or 14b.

The result of this arrangement of the components 18' and 19', 18" and 19" according to FIGS. 3 and 4 is that they will not be compressed by the piston 13 in its normal position corresponding to a substantially zero stiffness of the link 9', 9" in response to small-amplitude movements, and will on the contrary be compressed by this piston 13 in its maximum positions corresponding to high stiffnesses of the link 9', 9" in response to large-amplitude movements.

It will be noted that the radially external surface of these two stop components 18 and 19 could in a variant have a continuous cross section of non-annular shape, or even a discontinuous cross section of any shape, provided that each component 18, 19 imparts to the telescopic link 9 a stiffness which increases with its degree of axial compression between a low stiffness for the small-amplitude vibrations for uncoupling the wheel 2a from the torsion bar 8 and a high or very high stiffness for the large-amplitude movements which on the contrary bring this bar 8 into use.

Figure 5:
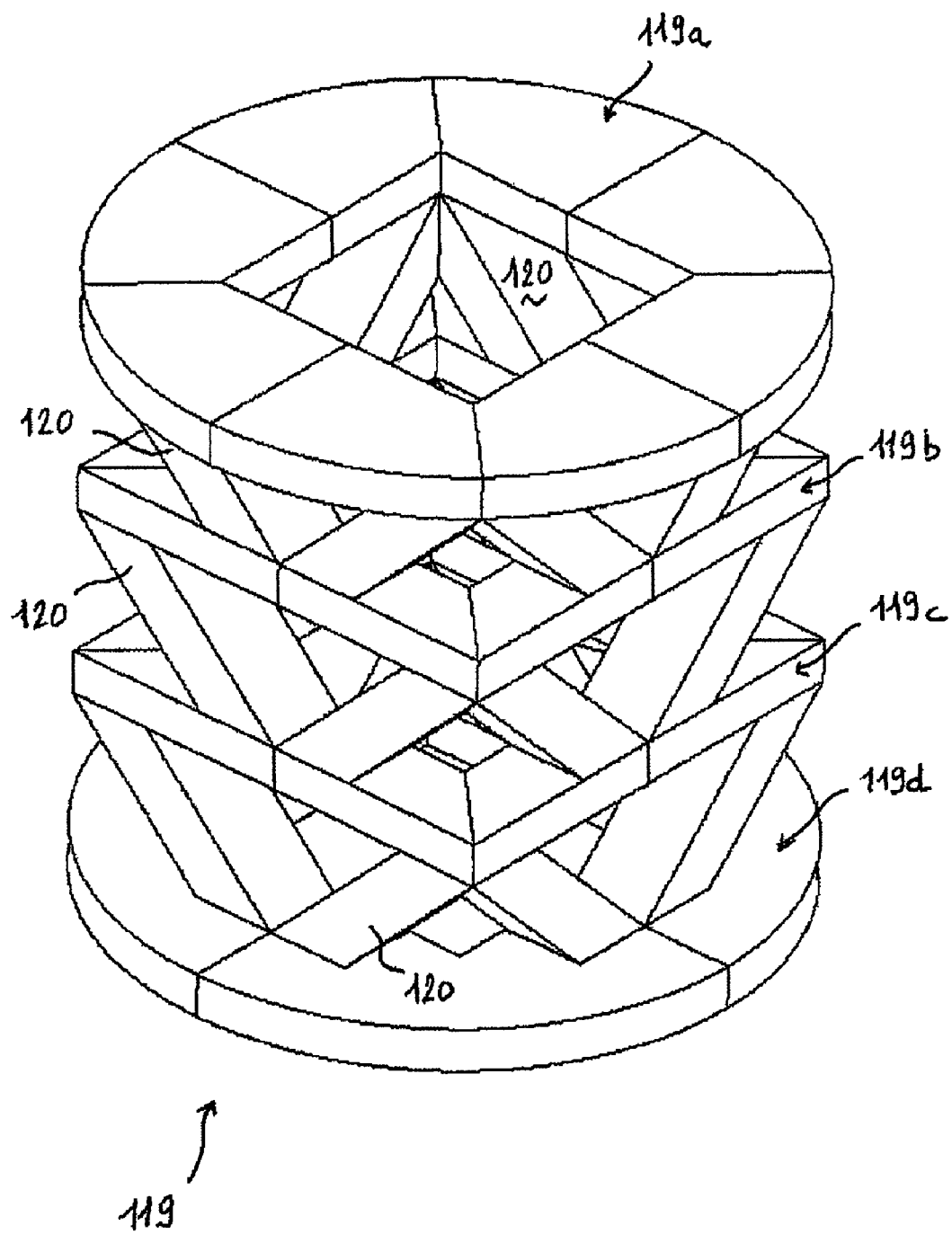
FIGS. 5 and 6 are two perspective views of another variant according to the invention of each of the two stop components that the telescopic link in FIG. 1 can comprise, inside a piston tube according to FIG. 2.
Figure 6:
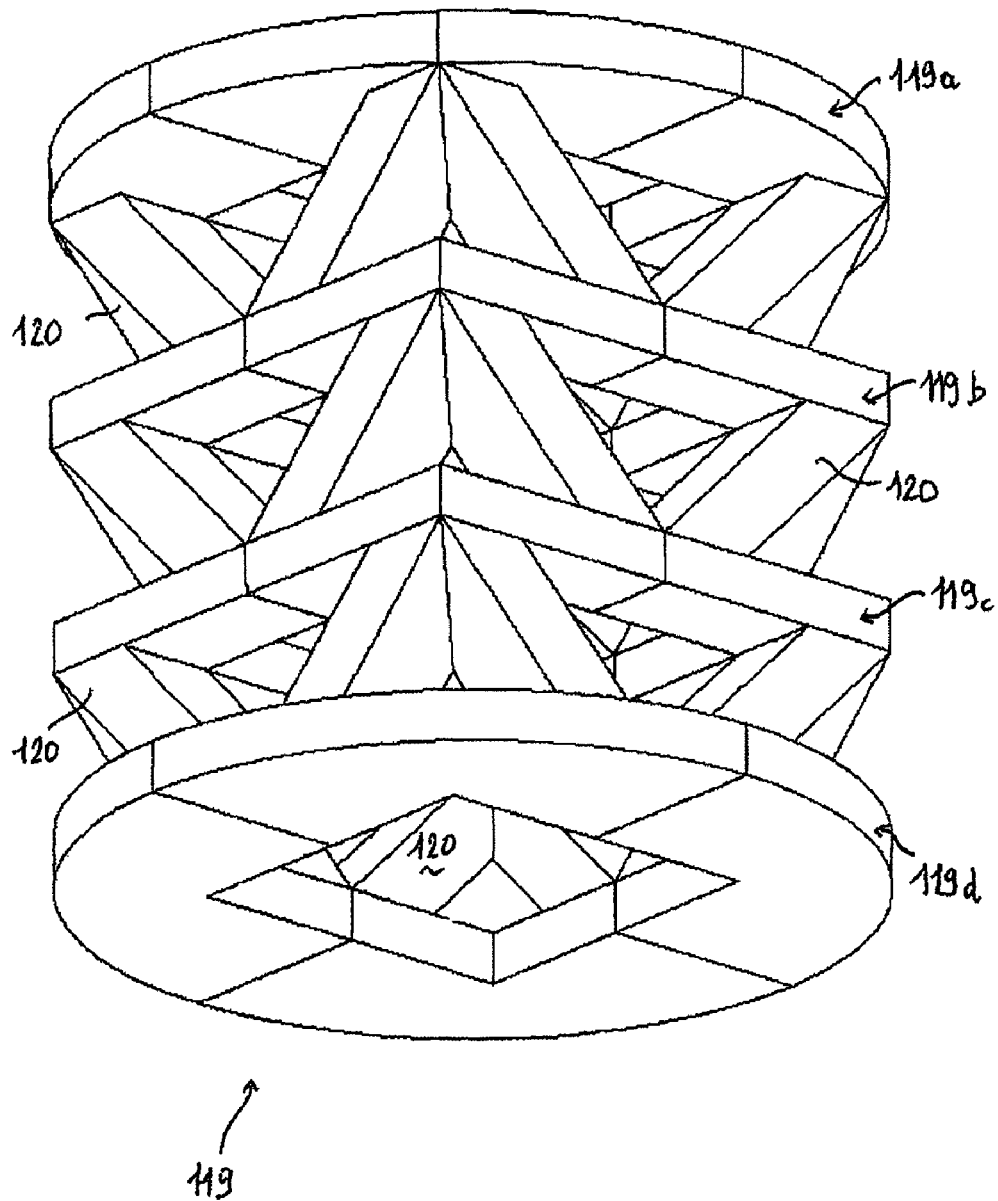

FIGS. 5 and 6 illustrate a preferred embodiment of such a discontinuous cross section compressible stop component 119, which can be used instead of each of the two components 18 and 19 in FIG. 2, for example, the other elements of the telescopic link 9 being unchanged. This component 119 includes a series of tiers 119a, 119b, 119c and 119d which are open at their centers like the coils of a spring, for mounting them about an operating rod of the piston (the rod and the piston, similar to those illustrated in FIGS. 2 to 4, are not illustrated) and which are connected axially to each other in twos by oblique connecting bars 120 spaced out on the periphery of these tiers 119a to 119d. To be more precise, the example in FIGS. 5 and 6 shows two intermediate tiers 119b and 119c of square shape which are each provided on each of their faces with a pair of bars forming a "V" on each of their four sides, and two end tiers 119a and 119d of circular shape which form bearing surfaces of the stop component on the piston and on the corresponding end wall of the piston tube.

In accordance with the invention, with reference to the example in FIG. 2, when the axis of the wheel 2a of the axle 2 rises slightly in a vertical plane due to its passage over an obstacle, typically when driving in a straight line, the stop component 19 oriented toward the shock absorber 6a is slightly compressed in the axial direction due to the force generated by this raising of the wheel and transmitted by the pull of the hinge 12a. This compression of the component 18 results in a slight axial lengthening of the link 9, via the telescopic movement of the rod 15 in the direction of the arrow A which is guided by the tubular portions 16a and 16b and, due to the weak return force (consequence of the low stiffness) exerted by this component 18 in the direction of the arrow B, the small-amplitude vibrations produced by this driving are hardly transmitted to the torsion bar 8 or the chassis of the vehicle 3, which means increased comfort for the passenger(s) in the passenger compartment of the vehicle 3.

Conversely, when the axis of the wheel 2a of the axle 2 falls slightly in a vertical plane when driving in a straight line due to its passage over a hole or recessed portion of the road, it is the stop component 18 oriented toward the torsion bar 8 which is slightly compressed in the axial direction due to the force generated by this lowering of the wheel and transmitted by the push of the hinge 12a. This compression of the component 19 results in a slight axial shortening of the link 9, via the telescopic movement of the rod 15 in the direction of the arrow C which is guided by the tubular portions 16a and 16b and, due to the weak return force (consequence of the low stiffness) exerted by this component 19 in the direction of the arrow D, the small-amplitude vibrations produced by this driving are also hardly transmitted to the torsion bar 8 or the chassis of the vehicle 3, with the resulting aforementioned comfort in its passenger compartment.

Thus, in these two cases of driving in a straight line on raised or recessed local irregularities encountered in a part of the terrain, these small-amplitude vibrations are hardly transmitted to the passenger compartment of the vehicle by the or each telescopic link 9, 10 according to the invention, due to the low stiffness which it has in these conditions.

On the other hand, when driving round a curve which causes a rolling movement for the vehicle 3 (e.g. on a curve or banked driving), the stop component 18 or 19—depending on the direction of the curve—is completely compressed by the rod 15/piston 13 assembly, and the high or very high axial rigidity which is thus imparted to the progressive stiffness link 9 enables the antiroll device 7 according to the invention to fully perform its function of limiting the roll angle on a curve, via the transmission of the forces to the torsion bar 8, and thus creating the same antiroll stiffness which would have been obtained by a known antiroll device of a type with two rigid lateral links.

The invention claimed is:

1. A passive antiroll device for the suspension of a motor vehicle comprising a torsion bar and two lateral links respectively articulated, on the one hand, to the two ends of the torsion bar by two first hinges and, on the other hand, to two lateral shock absorbers of the suspension by two second hinges, at least one of said links, or a telescopic link, including a piston slidably mounted in a piston tube by means of a rod which carries this piston and which is directly connected to the second hinge, the piston being able to slide reversibly due to the movement of the second hinge and cooperating in compression with return means housed inside said tube, wherein these return means include two compressible stop components which are positioned about said rod inside said tube and which are each designed to impart to the or each link, a progressive stiffness with compression in the axial direction of said rod which increases with the amplitude of the ascending or descending movements of the axis of the adjacent wheel of the vehicle, so that this wheel is substantially uncoupled from the torsion bar or coupled to it for small or large-amplitude movements, respectively, wherein said two compressible stop components each have a series of axially spaced out elements, which elements are:
    annular radial lobes, each stop component having in this case a continuous cross-section geometry of annular shape, the respective axial thicknesses of these lobes increasing axially from the said piston toward a corresponding end wall of said piston tube, or
    tiers open at their centers and connected axially to each other in pairs by oblique connecting bars spaced out on the periphery of the said tiers, each stop component having then a discontinuous cross-section geometry.

2. The antiroll device according to claim 1, wherein said rod passes through two axially opposed end walls of said tube by being slidably mounted in a tubular portion of the or each telescopic link which emerges from the end wall oriented toward the said first hinge and which is connected to it.

3. The antiroll device according to claim 2, wherein said first hinges which are articulated to the two ends of the torsion bar are ball joints.

4. The antiroll device according to claim 1, wherein said stop components are each designed to have a progressive stiffness which increases in stages with their compression in the said axial direction.

5. The antiroll device according to claim 1, wherein said stop components are each designed to have a progressive stiffness which increases continuously with their compression in the said axial direction.

6. The antiroll device according to claim 1, wherein said stop components are mounted at an axial distance from the piston by being respectively mounted on two axially opposed end walls of the said tube, so as not to be compressed by this piston in its normal position corresponding to a substantially zero stiffness of the telescopic link in response to small-amplitude movements, and to be compressed by the piston in its maximum positions corresponding to high stiffnesses of the link in response to large-amplitude movements.

7. The antiroll device according to claim 1, wherein said stop components are respectively mounted at an axial distance from two axially opposed end walls of the said tube by being mounted directly against two respective pressure faces of the piston, so as not to be compressed by this piston in its normal position corresponding to a substantially zero stiffness of the telescopic link in response to small-amplitude movements, and to be compressed by the piston in its maximum positions corresponding to high stiffnesses of the link in response to large-amplitude movements.

8. The antiroll device according to claim 1, wherein said two compressible stop components are respectively mounted directly against two pressure faces of the piston and against two axially opposed end walls of said tube, so as to be permanently compressed or decompressed by this piston with the said progressive stiffness, when the piston approaches the corresponding end wall of the said piston tube.

9. The antiroll device according to claim 1, wherein said stop components each have a radially external surface closely fitting at least locally the cylindrical wall of the said piston tube.

10. The antiroll device according to claim 1, wherein said stop components are each made of a cellular or compact type of elastomer.

11. The antiroll device according to claim 1, wherein said stop components are identical and symmetrical to each other in relation to said piston, so that they impart to the or each link identical stiffnesses for a same pressure exerted by the said piston on these components.

12. The antiroll device according to claim 1, wherein said stop components differ in their material and/or their shape, so that they impart preadjusted stiffnesses to the or each link differently for a same pressure exerted by the said piston on these components.

13. A suspension system of a motor vehicle intended to be mounted on a front or rear axle of the vehicle or between these two axles, said suspension system including an antiroll device connected to two lateral shock absorbers, wherein this antiroll device is as described in claim 1.

14. The antiroll device according to claim 1, wherein said first hinges which are articulated to the two ends of the torsion bar are ball joints.

15. The antiroll device according to claim 14, wherein said second hinges which are articulated to the shock absorbers are also ball joints.

* * * * *